UNITED STATES PATENT OFFICE.

JOHN ALLAN, OF HOBOKEN, NEW JERSEY.

PACKING.

SPECIFICATION forming part of Letters Patent No. 411,562, dated September 24, 1889.

Application filed June 11, 1889. Serial No. 313,821. (No model.)

*To all whom it may concern:*

Be it known that I, JOHN ALLAN, of Hoboken, in the county of Hudson and State of New Jersey, have invented a new and Improved Packing, of which the following is a full, clear, and exact description.

This invention relates to packing-rings, and has for its object to provide a packing which will be simple in construction and effective and durable.

The invention consists in a packing constructed and arranged as hereinafter described and claimed.

Reference is to be had to the accompanying drawings, forming a part of this specification, in which similar figures of reference indicate corresponding parts in both the views.

Figure 1 is a longitudinal section of a piston-valve with parts broken away, showing a packing constructed in accordance with this invention; and Fig. 2 is a vertical cross-section thereof on the line $x\ x$ of Fig. 1.

In carrying out this invention I provide hollow packing-rings having a circumferential slit extending throughout either their inner or outer periphery, whereby the rings are rendered yielding or compressible. The packing-rings are so shaped as to fit each other side by side, and be placed closely together, besides affording suitable bearing-surfaces against the adjacent surfaces of the parts between which the rings lie.

1 indicates a piston-valve and 2 its apertured casing, mounted in the external casing 3.

The valve 1 is formed with a recess or socket 4, extending about its periphery, and having one side closed by the removable circular plate 5, held by bolts 6. Within the peripheral recess 4 are located the hollow packing-rings 7, preferably formed with the cylindrical portion 8 on one side of their periphery, and the cylindrical portion 9 on the other side of their periphery, the cylindrical portion 9, having the adjacent separated edges 10, formed by a slit 11, extending throughout the periphery of the ring. The rings 7 are formed with curved sides 12, so as to fit and lie snugly together, and the side 13 of the recess 4 is correspondingly shaped, so as to permit the adjacent packing-ring 7 to fit closely. On the opposite side of the recess 4 is located a movable circular plate 14, having its side adjacent to the adjoining packing-ring 7 shaped to fit the same. Through the plate 5 project set-screws 15, which bear against the circular plate 14. By means of this construction the rings 7 may be compressed and the packing tightened by screwing up the screws 15, thereby forcing the plate 14 against the rings 7, and causing the edges 10 to be moved toward each other, and the cylindrical peripheral sides 8 and 9 of the rings 7 to be pressed against the adjacent surfaces.

It will thus be seen that a tight packing is provided, which may be readily regulated.

The rings 7, constructed as above described, are preferably made of metal on account of being more durable. It will be understood that the rings 7 may be made of any suitable shape to adapt them to be fitted to the particular parts with which they may be employed.

(No Model.)
R. ALLERT.
APPARATUS FOR DISSOLVING AND SUPPLYING LUPULINE TO BEER.
No. 411,563. Patented Sept. 24, 1889.
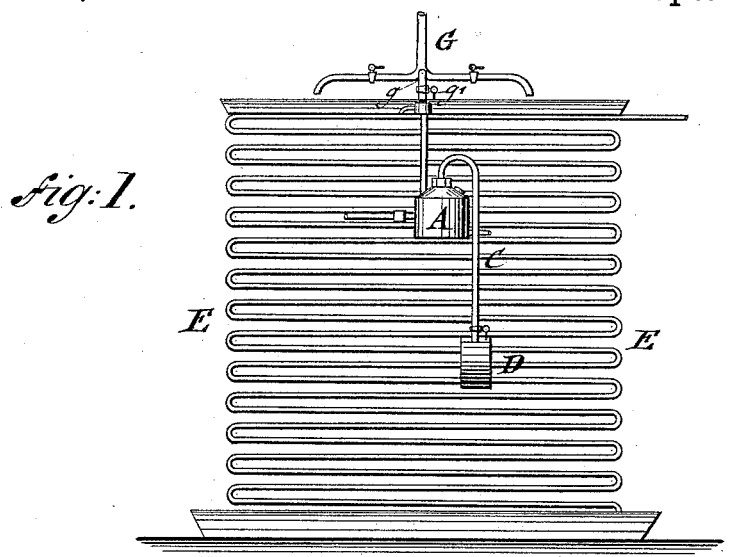

Having thus described my invention, I claim as new and desire to secure by Letters Patent—

1. A packing consisting of a number of hollow packing-rings formed with a slit extending throughout their periphery, and having separated edges movable toward each other, said rings being arranged one above the other, and their peripheral slits opening alternately in opposite directions, substantially as shown and described.

2. A hollow packing-ring 7, having curved sides 12, and one side of its periphery formed with the cylindrical portion 8, the other side of its periphery formed with the cylindrical portion 9, having a circumferential slit 11, with adjacent separated edges 10, movable toward each other, substantially as shown and described.

3. A packing consisting of a number of hollow packing-rings formed with curved sides, and having one side of their periphery formed with a cylindrical circumferential portion, and the other side of the periphery formed with a cylindrical circumferential portion having a circumferential slit with separated edges movable toward each other, substantially as shown and described.

JOHN ALLAN.

Witnesses:
JNO. C. BARLEY,
JOHN GARRICK.